United States Patent
Fearnow (10) Patent No.: US 8,521,715 B1
(45) Date of Patent: *Aug. 27, 2013

(54) SYSTEM FOR SENDING QUERIES TO A PLURALITY OF WEBSITES SYNCHRONOUSLY

(75) Inventor: Troy Fearnow, Spring, TX (US)

(73) Assignee: Accrue Search Concepts, Inc., Spring, TX (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/112,920

(22) Filed: May 20, 2011

Related U.S. Application Data (60) Provisional application No. 61/346,643, filed on May 20, 2010, provisional application No. 61/346,653, filed on May 20, 2010.

(51) Int. Cl.
*G06F 17/30* (2006.01)

(52) U.S. Cl.
USPC ..... 707/707; 707/709; 707/737; 707/999.003

(58) Field of Classification Search
USPC ........... 707/706–709, 713, 717, 738, 752, 707/754, 999.003, 999.006; 715/835, 839
See application file for complete search history.

(56) References Cited

U.S. PATENT DOCUMENTS

| | | | | |
|---|---|---|---|---|
| 6,968,380 | B1* | 11/2005 | Singhal et al. | 709/226 |
| 2008/0288893 | A1* | 11/2008 | Nikkels et al. | 715/848 |
| 2009/0007017 | A1* | 1/2009 | Anzures et al. | 715/835 |
| 2010/0241507 | A1* | 9/2010 | Quinn et al. | 705/14.42 |

* cited by examiner

*Primary Examiner* — Marc Filipczyk
(74) *Attorney, Agent, or Firm* — Buskop Law Group, PC; Wendy Buskop (57) ABSTRACT

One or more computer systems for using favicons to send queries to searchable webpages and obtaining a search results page for each searchable webpage over a network are provided.

14 Claims, 4 Drawing Sheets

| | |
|---|---|
| CLIENT SOFTWARE APPARATUS | ~150 |
| COMPUTER INSTRUCTIONS FOR EMBEDDING THE FIRST PLURALITY OF FAVICONS INTO THE MARKED SEARCHABLE WEBPAGE | ~239 |
| COMPUTER INSTRUCTIONS FOR INSTALLING THE USER INTERFACE | ~240 |
| COMPUTER INSTRUCTIONS FOR MARKING A SEARCHABLE WEBPAGE | ~241 |
| COMPUTER INSTRUCTIONS FOR DISPLAYING THE SECOND PLURALITY OF FAVICONS | ~242 |
| COMPUTER INSTRUCTIONS FOR RECEIVING A SEARCH ELEMENT IN THE SEARCH FIELD | ~243 |
| COMPUTER INSTRUCTIONS FOR RECEIVING A SEARCH ELEMENT INPUTTED TO THE WEB BROWSING APPARATUS | ~244 |
| COMPUTER INSTRUCTIONS FOR EXTRACTING A SEARCH ELEMENT FROM THE CURRENT UNIFORM RESOURCE LOCATION (URL) OF THE WEB BROWSING APPARATUS | ~245 |
| COMPUTER INSTRUCTIONS FOR AUTOMATICALLY INSERTING THE SEARCH ELEMENT INTO A URL ASSOCIATED WITH ONE OF THE FAVICONS THAT IS CHOSEN USING THE CLIENT SOFTWARE APPARATUS, AN ADMINISTRATIVE HOST WEBSITE, OR BOTH | ~290 |
| COMPUTER INSTRUCTIONS FOR IDENTIFYING AN INTEREST CATEGORY BASED ON A WEBSITE CURRENTLY BEING VIEWED BY A USER, AND SIMULTANEOUSLY CHANGING THE INTEREST CATEGORY OF THE USER TO AN ALTERNATIVE INTEREST CATEGORY THAT CORRESPONDS TO THE USER SELECTED WEBSITE | ~295 |
| COMPUTER INSTRUCTIONS FOR REMOVING A RESULTS LINK FROM A SECOND SET OF RESULTS LINKS THAT IS THE SAME AS A RESULTS LINK FROM THE FIRST SET OF RESULTS LINKS | ~291 |
| COMPUTER INSTRUCTIONS THAT ALLOW THE USER TO DELETE OR EDIT AT LEAST ONE OF THE INTEREST CATEGORIES FROM THE ADMINISTRATIVE HOST WEBSITE | ~292 |
| COMPUTER INSTRUCTIONS FOR IDENTIFYING AN INTEREST CATEGORY AND SEARCH TERM BASED ON A USER SELECTED WEBSITE CURRENTLY BEING VIEWED BY A USER, AND FOR SIMULTANEOUSLY CHANGING THE INTEREST CATEGORY OF THE USER TO AN ALTERNATIVE INTEREST CATEGORY THAT CORRESPONDS TO THE USER SELECTED WEBSITE | ~293 |

SYSTEM FOR SENDING QUERIES TO A PLURALITY OF WEBSITES SYNCHRONOUSLY

CROSS REFERENCE TO RELATED APPLICATIONS

The present patent application claims priority to and the benefit of U.S. Provisional Patent Application No. 61/346,643, which was filed May 20, 2010, entitled "SYSTEM FOR SENDING QUERIES TO A PLURALITY OF WEBSITES SYNCHRONOUSLY" and to U.S. Provisional Patent Application No. 61/346,653, which was filed May 20, 2010, entitled "COMPUTER ASSISTED METHOD FOR DECENTRALIZED WEBSITE SEARCHING". These references are incorporated herein in there entireties.

FIELD

The present embodiments generally relate to a system for sending queries having at least one search element to a plurality of search result webpages synchronously and enabling a user to toggle between the search results using favicons.

BACKGROUND

A need exists for a faster search tool which can be displayed as a tool bar.

A further need exists for identifying and providing convenient access to ideal searchable sources for any given user query using a common search term. When the web was in its infancy, few websites were driven by a database, however, that is no longer the case. A website driven by a database is virtually impenetrable to standard search engine gathering techniques (also known as crawling). As websites became more sophisticated and difficult to crawl, niche search engines began to emerge.

Niche search engines focus on providing more meaningful results on a specific subject matter. In doing so, many are able to achieve superior results for their respective industry (usually from direct data feeds of participating websites), displaying more pertinent information, and in a more timely manner. Unfortunately, many of these sites are underutilized as the average consumer is unaware of them at the time of search or when they are needed.

The embodiments of the systems and methods can suggest an ideal set of searchable sources and save time and keystrokes in searching those sources.

The present embodiments meet these needs.

BRIEF DESCRIPTION OF THE DRAWINGS

The detailed description will be better understood in conjunction with the accompanying drawings as follows:

FIG. 2 depicts a detailed schematic of one or more embodiments of the client software apparatus.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for sending queries to searchable webpages and obtaining a search results page for each searchable webpage.

One or more embodiments of the system can include a network. A processor can be in communication with the network. A client device can be in communication with the processor and can be used to enter or provide user data, such as words or numbers, to the processor.

The system can also include an administrative host website in communication with the network. The administrative host website can also be in communication with the processor via the network.

A web browsing apparatus can be in communication with the processor. The web browsing apparatus can also be in communication with the network. The system can also include a client software apparatus in communication with the processor. The client software apparatus can also communicate with the network and the administrative host website. The processor can also be in communication with a data storage. The data storage can include a plurality of computer instructions.

In one or more embodiments, at least a portion of the client software apparatus can be stored in the data storage, on the administrative host website, or both.

The client software apparatus can display a user interface, and the user interface can include a display area. A favicon can be displayed in the display area. The favicon can be associated with a searchable website.

The method can include creating an administrative host website in communication with an administrative host website.

The administrative host website can be viewable from a network, such as the World Wide Web, a local area network, a fiber optic network, or a similar network. The administrative host website can include or be in communication with a host processor or server and data storage. The administrative processor can store information in the administrative data storage. The administrative data storage can have a plurality of computer instructions for performing a variety of actions.

For example, the administrative host website can have a first computer instruction or first computer instructions to instruct the administrative processor to dynamically store a plurality search result pages into interest categories. The term "interest category" as it is referred to herein can be related to groups of websites which contain at least one predefined searchable website, such as Amazon.com™.

The administrative host website can contain a client software apparatus that can be downloaded and installed onto a user's computer.

The client software apparatus can have computer instructions for adding a dynamic toolbar to the user interface of a user identified web browsing apparatus.

The client software apparatus can include computer instructions for communicating over the network to engage the administrative host website with a web browsing apparatus. The web browsing apparatus can be any internet web browser, such as Internet Explorer, Firefox, Safari, or similar web browsers. The web browsing apparatus can be located on a personal computer, a laptop, a mobile phone, a tablet, or other devices capable of accessing the internet.

The dynamic tool bar includes computer instructions for presenting one or more dynamic search fields to a user for input or selection. Each dynamic search field enables a user to enter at least one search element into the field.

The client software apparatus can contain computer instructions for automatically populating at least one dynamic search field from (i) a search element entered into a webpage, (ii) a search element extracted from the current Uniform Resource Locator (URL) of the user's web browsing apparatus, (iii) or predefined search elements stored by the user.

In one example, the computer instructions for presenting at least one interest category from an interest category menu to a user can identify a current URL that the user is currently visiting. The computer instructions can then browse or search a category library or database to determine what categories have the URL. The computer instructions can then present the categories of the URL to the user.

In another example, the computer instructions can further focus its category suggestions by searching category databases or libraries based on a pattern extracted from the current URL using a RegEx or similar pattern matching expression. For example, if a user is on Amazon.com/books, the computer instructions could reference a RegEx expression stored in data storage of the administrative host server, the user's computer, or combination thereof that associates that URL with an Amazon site in the category for books. This can allow for distinct category recognition within a particular URL domain.

The computer instructions for presenting at least one interest category from an interest category menu to a user can also present categories to the user based on the words typed by a user. For example, the computer instructions for presenting at least one interest category from an interest category menu to a user can query an index or third party sites and retrieve URLs from the index or third party site and match those URLs to sites within categories stored in the data storage. Then the computer instructions for presenting at least one interest category from an interest category menu to a user can present the user with suggested categories based on matches.

The computer instructions for presenting at least one interest category from an interest category menu to a user can also present categories as a user types words into a search box. For example, each letter can be identified and the order of the letters can be determined and the typed letters and order of typed letters can be matched to keyword terms that include the combination of typed letters and order of typed letters. Then the keywords can be ranked based on their frequency of use. Then an index or third party site can be searched for URLs associated with the keywords, and the identified URLs can be matched to URLs of sites in categories. Then identified categories can be suggested to the user.

The computer instructions for presenting at least one interest category from an interest category menu can dynamically create the category based on the words typed by the user into the search field. Sites within the dynamically created category can be determined by (i) querying at least one keyword entered into the search field with an index or third party sites and retrieve URLs from the index or third party site and match those URLs to sites within categories stored in the data storage. The dynamically created category can consist of the sites from each matched category; (ii) querying at least one keyword entered into the search field with an index of keywords and sites historically searched by a plurality of users. For example, querying "fried green tomatoes" against the index of keywords and sites historically searched by a plurality of users may find the sites allrecipies.com, epicurious, and imdb.com were searched the most; or (iii) combinations thereof.

The client software apparatus can include computer instructions for presenting at least one interest category from an interest category menu to a user.

The at least one dynamic search field can adjust to coincide with the currently selected interest category. Adjustment can include the (i) size of the search field, (ii) the format or type of search element that can be entered into the search field, (iii) the number of fields displayed, (iv) or combinations thereof.

An interest category can adjust to coincide with (i) a change in the search element, (ii) a manual change of one of the interest categories by the user from the interest category menu, (iii) a suggested interest category that has been suggested on the current webpage being viewed, (iv) the current URL of the web browsing apparatus, or (v) combinations thereof. In one or more embodiments, the interest category can simultaneously adjust to coincide with one or more of the above.

In one or more embodiments, the suggested interest category that has been suggested on the current webpage being viewed can either be embedded from the website publisher or by the client software apparatus.

The client software apparatus can include computer instructions for displaying one or more favicons as a result of a search element or selection of an interest category. The favicons can be any icon such as icons supplied by website publishers or icons created by an administrator. The favicons can be displayed in a display area on the web browsing apparatus. The display area can be a window, a tool bar, side bar, an existing element of the browsing apparatus like the address bar, or combinations thereof. The favicons that are displayed by the client software apparatus in the display area can change or be selected based on at least one of (i) an interest category, (ii) a search element inputted into a currently viewed webpage, (iii) at least one search element extracted from a current URL, (iv) a search element inputted to the tool bar, (v) or combinations thereof. For example, a first set of favicons can be displayed for a first interest category, and a second set of favicons can be displayed for a second interest category. As another example, if a user navigates to "BlockBuster.com" the display area can be changed to include favicons that represent "Netflix.com", "HollywoodVideo.com", "Redbox.com", and other closely related searchable websites.

Each favicon can represent a searchable website. Each favicon can be directly linked to a search result page of the associated searchable website. For example, if each favicon is directly linked to the search result page, the client software apparatus can insert the search term into a URL associated with the favicon and direct the web browsing apparatus to the search result page for a selected favicon.

In one or more embodiments, each favicons can be indirectly linked to the search result page of the associated searchable website through the administrative host website. The search result page can be a search engine result page "SERP", such as GOOGLE™ search result page, an AMAZON™ search result page, or any other search result page. A search result page can be any webpage that is normally displayed by a web browsing apparatus after a user has inputted search criteria into the aforementioned webpage.

If the favicons are indirectly linked to the search result page through the administrative host website, the URLs of the associated favicons can be dynamically generated by the client software apparatus using at least one search element and a unique identification variable that is associated with the respective search result pages, which can then be passed from the client software apparatus to the administrative website, which can then create the final destination URL.

For example, if a search element "PICASSO" is entered and a favicon associated with "Fine-Art.com" is selected by a user, the web browsing apparatus is directed to the administrative host website with a URL containing the search element "PICASSO" and a unique identification variable, such as 3972A, which is associated with "Fine-Art.com", whereupon the administrative host website dynamically generates the URL for the search result page for "Fine-Art.com" using the unique identification variable to search the administrative date storage and uses computer instructions or code to inject the search term into the URL. As such, the administrative host website directs the web browsing apparatus to the search result page of http://www.fine-art.com/artsearch.asp?keywords=Picasso representing search results for "PICASSO".

The client software apparatus can include computer instructions for placing and embedding at least one favicon into a search result page currently being viewed by the user on the web browsing apparatus. Embedded favicons can function similarly to the favicons discussed above.

Accordingly, the embodied methods and systems can allow for easy searching with a search term by clicking on favicons in the display area or embedded favicons on a search result page, thereby, allowing for repeated searching and comparison of the predefined searchable websites without having to manually enter the search element in each searchable website.

One or more embodiments of the method can include one or more favicons statically placed on the toolbar not associated with a category. The static favicons can be substantially similar to the favicons described above.

One or more embodiments of the method can use one or more interest categories. Illustrative interest categories can include a search category, such as Search, a reference category, such as Reference, a blog category, such as Blogs, a now category, such as Now!, a torrents category, such as Torrents|File Sharing, a job category, such as Jobs, an images category, such as Images, a video category, such as Video, a music category, such as Music, a finance category, such as Finance, a news category, such as News, a maps category, such as Maps a people category, such as People, a groups category, such as Boards|Groups, a social bookmark category, such as Social Bookmarks, a health and medicine category, such as Health & Medicine, or other such categories.

In one or more embodiments the client software apparatus can include computer instructions for allowing the user to add an additional searchable website to the list of searchable websites within the administrative host website, a data storage in communication the web browsing apparatus, or both. For example, a website address such as http://www.careerbuilder.com can be typed into the list of searchable websites and can be administrated using the client software apparatus, such as a dynamic toolbar, or the host administrative website. The host administrative website can perform a series of steps to extract search related variables and the appropriate favicon from the searchable website and store them in the administrative host website.

The client software apparatus can also have computer instructions for allowing the user to add and associate a searchable website in the administrative host website with any input field on the web. In this embodiment, the user can right-click on an input field and enter a name into a subsequently provided form created by the software apparatus. For example, a user can right-click on an input field located on the webpage http://www.yelp.com and Yelp can be typed into the list of searchable websites.

The client software apparatus can further include computer instructions for allowing the user to insert another interest category to the interest category menu within the administrative host website.

The client software apparatus, the administrative website, or both can include computer instructions allowing the user to delete or edit one of the searchable websites on the list of searchable websites.

The client software apparatus, the administrative website, or both can also include computer instructions to allow the user to delete or edit from the administrative host website at least one of the interest categories.

In one or more embodiments of the method, search results for a search element that appear on a first search result page are removed from subsequent search result pages. For example, if the search term "art" is searched and a first search result page displays results from google.com, and a subsequent search result page for bing.com is toggled to using one or more of the favicons, the results from google.com will not be displayed on the bing.com search results page. As such, the results displayed on subsequent search result pages can be filtered to provide more targeted search results and reduce duplicate results.

One or more embodiments of the method can include using computer instructions in the administrative host website that allows the user to prioritize the order of the predefined searchable websites, the interest categories, or combinations thereof.

The client software apparatus can include computer instructions that allow the user to prioritize the order of the predefined searchable websites in the display area by moving the icons using a mouse or other input device.

From 10 interest categories to 100,000 interest categories can be used in an embodiment and stored in the administrative host website.

An embodiment allows the user to double click on a favicon and simultaneously open a predetermined number of tabs or windows on the web browsing apparatus. Each tab or window displays the search result page for the searchable website associated with the predetermined number of favicons. A subsequent icon can be clicked or a predefined hotkey or series of hotkeys can be pressed by the user to close any number of the aforementioned tabs or windows. In one or more embodiments, an option can be selected or entered as a default to allow a plurality of favicons to simultaneously open for a predetermined number of tabs or windows on the web browsing apparatus.

In one or more embodiments, a user can enter a search term into a search element box and a predetermined number of search result pages associated with the favicons can be aggregated and displayed on the web browsing apparatus as a new tab or window. In addition, when the result pages associated with the favicons are aggregated any duplicate result links can be filtered or removed.

In one or more embodiments, the priorities of sites within a category can be prioritized in a default position. A user can go in and adjust the priority of sites within categories, the modified priorities will be associated with the user. As such a plurality of users can rate the sites on importance. The system can periodically or selectively sum the plurality of rankings for each site and divide by the total number of users to arrive at a new priority for the sites within the categories.

For example, if there were 2 users. The first user could rate site A a 3, site B a 1, and site C a 2; a second user could rate site A a 3, site B a 1, and site C a 2. The system can come in and rerate the sites. For example site A would be rated a 3, site B would be a 1, and site C would 2. Then the categories can be reprioritized. The higher number can be the most import or the least important depending on the ranking system used. Although the system can reprioritize the default category database based on user ratings, the priorities associated with individual independent users can be maintained as the individual independent users arranged them using an override table.

Figure 1:
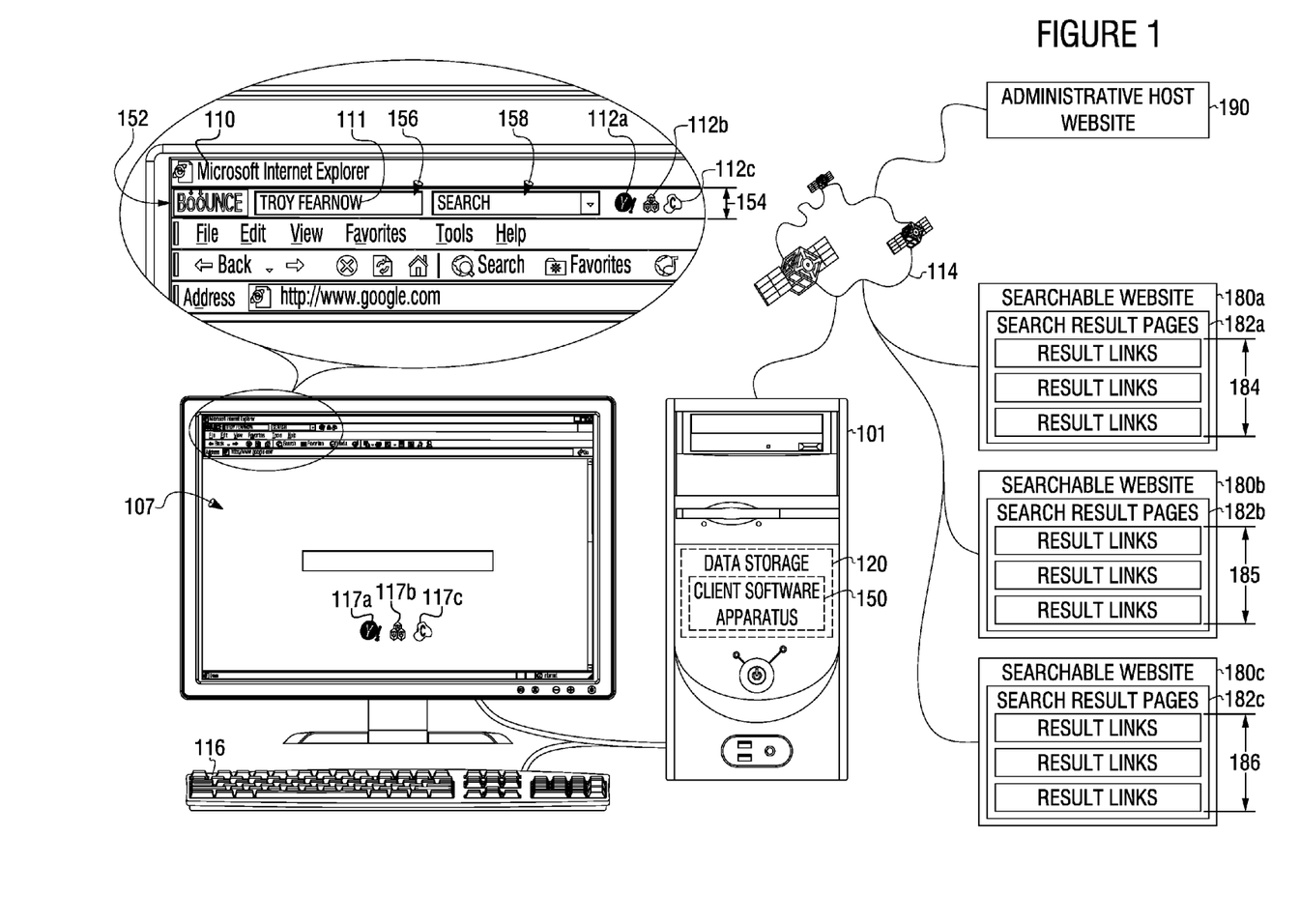
FIG. 1 depicts a schematic of an illustrative system that can be used with one or more embodiments of the method.

Turning now to the Figures, FIG. 1 depicts a schematic of an illustrative system that can be used with one or more embodiments of the method. The system can include a processor 101, a client input device 116, an administrative host website 190, a web browsing apparatus 110 in communication with the processor 101, a network 114 in communication with the processor 101, a client software apparatus 150, and a data storage 120 in communication with the processor 101.

The administrative host website 190 can be or include a server in communication with one or more data storages. The administrative host website 190 can be in communication with the network 114, and the administrative host website 190 can communicate with the processor 101, the client software apparatus 150, and the web browsing apparatus 110 via the network 114. The administrative host website 190 is discussed in more detail below in FIG. 3.

The processor 101 can be a personal computer, a mobile device, such as a smart phone, a tablet, or a similar device. The client input device 116 can be a keyboard on the processor, a mouse, a touch screen, or other device that allows the processor 101 to receive input provided by the user.

The web browsing apparatus 110 can be a web browsing tool, such as INTERNET EXPLORER™, FIRE FOX™, or a similar software package that allows a person to navigate a network, such as the internet. The web browsing apparatus 110 can be displayed on a screen of the processor 101. A portion or all of the web browsing apparatus 110 can be stored on the data storage 120.

The data storage 120 can be a virtual hard drive, a flash drive, an internal hard drive, an external hard drive, or combinations thereof. The data storage 120 can include the client software apparatus 150. The client software apparatus 150 is explained in more detail in FIG. 2.

A first plurality of favicons 117a, 117b, and 117c can be embedded into a marked searchable webpage 107. The marked searchable webpage 107 can be marked using the client software apparatus or by having the website publisher mark the marked searchable webpage 107.

The client software apparatus 150 can display a user interface 152. The user interface 152 can have a display area 154, a second plurality of favicons 112a, 112b, and 112c, a search field area 156, and a category selector 158. The user interface 152 can be embedded on the web browsing apparatus 110.

The search field area 156 can receive one or more search elements 111. The search element 111 can be a key word, a date, or the like. The number of search elements required or accepted can depend on a category selected using the category selector 158. For example, the category selector 158 can include a search category, a reference category, a blog category, a now category, a torrents category, a job category, an images category, a video category, a music category, a finance category, a news category, a maps category, a contacts category, a people category, a groups category, a social bookmark category, a health and medicine category, and combinations thereof.

Each favicons 112a, 112b, and 112c can be associated with one of the searchable websites 180a, 180b, and 180c via the network 114. The searchable websites 180a, 180b, and 180c can have one or more search results pages 182a, 182b, and 182c. The first search results page 182a can have one or more first set of search result links 184. The second results page 182b can have one or more second sets of search result links 185. The third search result page 182c can have one or more third sets of search result links 186. The result links can include Uniform Resource Locations (URLs) or Uniform Resource Identifiers (URIs).

FIG. 2 depicts a detailed schematic of one or more embodiments of the client software apparatus 150. The client software apparatus 150 can include computer instructions for embedding the first plurality of favicons into the marked searchable webpage 239, computer instructions for installing the user interface 240, computer instructions for marking a searchable webpage 241, computer instructions for displaying the second plurality of favicons 242, computer instructions for receiving a search element in the search field 243, computer instructions for receiving a search element inputted to the web browsing apparatus 244, and computer instructions for extracting a search element from the current uniform resource location (URL) of the web browsing apparatus 245.

The client software apparatus 150 can also have computer instructions for automatically inserting the search element into a URL associated with one of the favicons that is chosen using the client software apparatus, an administrative host website, or both 290.

The client software apparatus 150 can also have computer instructions for identifying an interest category based on a website currently being viewed by a user, and simultaneously changing the interest category of the user to an alternative interest category that corresponds to the user selected website 295.

The client software apparatus can also have one or more additional computer instructions (not shown). For example, the client software apparatus can have computer instructions for identifying searchable websites based on the habits of all or a substantial portion of the users of the system. In one or more embodiments, the additional computer instructions can also identify categories based on the habits of all or a substantial portion of users of the system.

The client software apparatus 150 can also include computer instructions for removing a results link from a second set of results links that is the same as a results link from the first set of results links 291.

The client software apparatus 150 can also include computer instructions that allow the user to delete or edit at least one of the interest categories from the administrative host website 292.

The client software apparatus 150 can also include computer instructions for identifying an interest category and search term based on a user selected website currently being viewed by a user, and for simultaneously changing the interest category of the user to an alternative interest category that corresponds to the user selected website 293.

Figure 3:
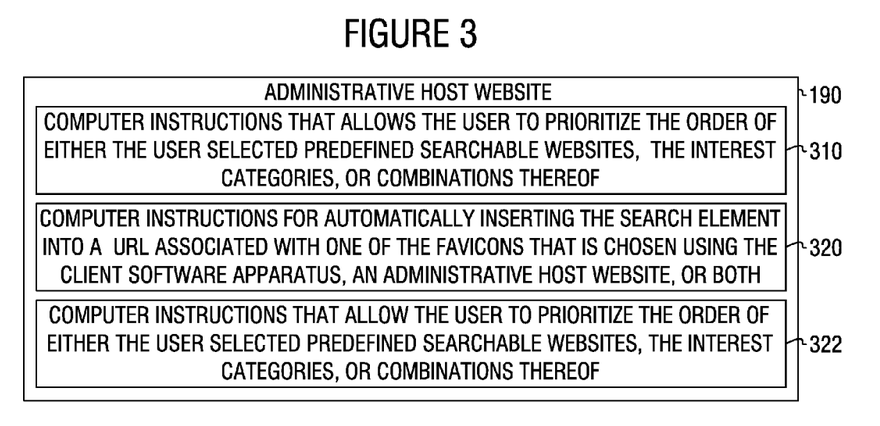
FIG. 3 depicts a detailed view of an illustrative administrative host website according to one or more embodiments.

FIG. 3 depicts a detailed view of the administrative host website 190.

The administrative host website 190 can include computer instructions that allows the user to prioritize the order of either the user selected predefined searchable websites, the interest categories, or combinations thereof 310.

The administrative host website 190 can also include computer instructions for automatically inserting the search element into a URL associated with one of the favicons that is chosen using the client software apparatus, an administrative host website, or both 320.

In addition, the administrative host website 190 can also include addition computer instructions (not shown). The additional computer instructions can identify searchable websites based on the habits of all users. In one or more embodiments, the additional computer instructions can also identify categories based on the habits of all or a substantial portion of users of the system.

The administrative host website 190 can have computer instructions that allow the user to prioritize the order of either the user selected predefined searchable websites, the interest categories, or combinations thereof 322.

Figure 4:
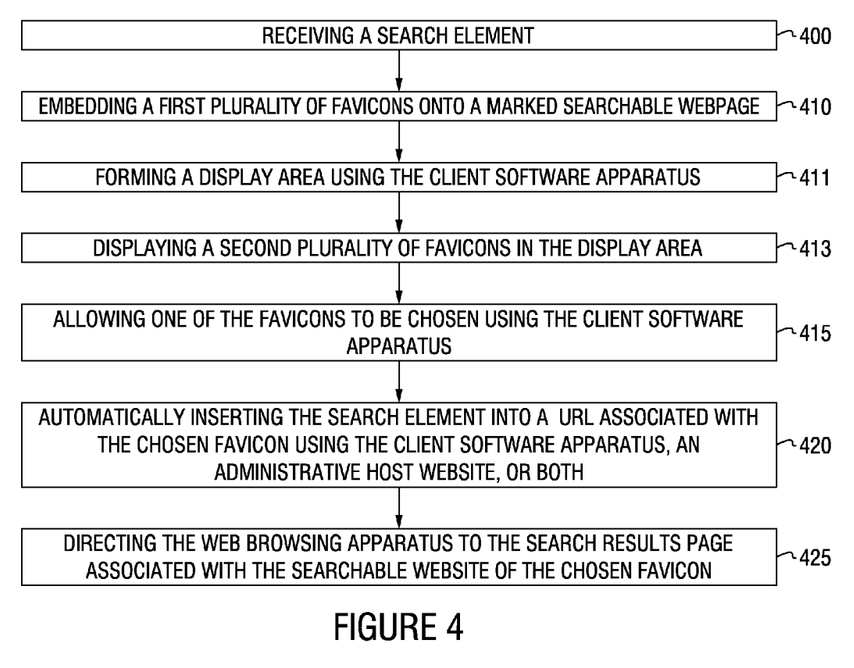
FIG. 4 depicts a flow diagram of an illustrative embodiment of the method.

FIG. 4 depicts a flow diagram of an illustrative embodiment of the method.

The method can include receiving a search element, as depicted at box 400. The search element can be inputted to the client software apparatus; inputted to the web browsing apparatus; extracted from a current URL of the web browsing apparatus; extracted from a pre-saved search element; obtained from a determined search element based on a IP address, browsing history, GPS location; or combinations thereof.

The method can also include embedding a first plurality of favicons onto a marked searchable webpage, as depicted at box 410. Each favicon can be associated with a searchable webpage. The favicons can be provided by the client software apparatus.

In addition the method can include forming a display area using the client software apparatus, as depicted in box 411. The method can also include displaying a second plurality of favicons in the display area, as depicted at 413. The first plurality of favicons can be the same as the second plurality of favicons.

The method can also include allowing one of the favicons to be chosen using the client software apparatus, as depicted at box 415.

At box 420, the method can also include automatically inserting the search element into a URL associated with the chosen favicon using the client software apparatus, an administrative host website, or both.

The method can also include directing the web browsing apparatus to the search results page associated with the searchable website of the chosen favicon, as depicted in box 425. The search results page can include a first set of results links.

While these embodiments have been described with emphasis on the embodiments, it should be understood that within the scope of the appended claims, the embodiments might be practiced other than as specifically described herein.

What is claimed is:

1. A system for sending queries to searchable web pages and obtaining a search results page for each searchable web page over a network, wherein the system comprises:
   a. a processor in communication with a network;
   b. a client input device in communication with the processor;
   c. an administrative host website in communication with the network;
   d. a web browsing apparatus in communication with the processor;
   e. a plurality of favicons associated with a plurality of searchable web pages;
   f. a client software apparatus in communication with the processor; and
   g. a data storage in communication with the processor wherein the system is configured to perform a method of using favicons to send queries to a plurality of searchable webpages to obtain a search result page for each searchable webpage over the network, wherein the method comprises: receiving a search element from a user using the client software apparatus; displaying favicons; receiving selection of one of the favicons; automatically inserting the search element into a Uniform Resource Locator associated with the chosen favicon using the client software apparatus, the administrative host website, or both; directing the web browsing apparatus to a search results page associated with the searchable website of the chosen favicon, wherein the search results page comprises a first set of results links; and identifying an interest category and search term based on a user selected website currently being viewed by the user, and simultaneously changing the interest category of the user to an alternative interest category that corresponds to the user selected website.

2. The system of claim 1, wherein at least a portion of the client software apparatus is stored in the data storage.

3. The system of claim 1, wherein at least a portion of the client software apparatus is stored on the administrative website.

4. The system of claim 1, wherein the client software apparatus displays a user interface, wherein the user interface comprises a display area.

5. The system of claim 4, wherein the favicon is displayed in the display area.

6. The system of claim 1, wherein the client software apparatus comprises:
   a. computer instructions for installing the user interface;
   b. computer instructions for displaying favicons;
   c. computer instructions for receiving a search element in the search field;
   d. computer instructions for receiving a search element inputted to the web browsing apparatus; and
   e. computer instructions for extracting a search element from the current URL of the web browsing apparatus.

7. The system of claim 1, wherein the client software apparatus comprises computer instructions for creating an interest category menu, wherein the interest category menu has at least two categories selected from the group consisting of:
   a. a search category;
   b. a reference category;
   c. a blog category;
   d. a now category;
   e. a torrents category;
   f. a job category;
   g. an images category;
   h. a video category;
   i. a music category;
   j. a finance category;
   k. a news category;
   l. a maps category;
   m. a people category;
   n. a groups category;
   o. a social bookmark category;
   p. a health and medicine category; and
   q. combinations thereof.

8. The system of claim 1, wherein the data storage is a virtual hard drive, a cloud of hard drives, a flash drive, an internal hard drive, an external hard drive, or combinations thereof.

9. The system of claim 1, wherein the client software apparatus comprises computer instructions for removing a results link from a second set of results links that is the same as a results link from the first set of results links.

10. The system of claim 1, wherein the client software apparatus comprises computer instructions that allow the user to delete or edit at least one of the interest categories from the administrative host website.

11. The system of claim 1, further comprising computer instructions on the administrative host website that allow the user to prioritize the order of either the user selected predefined searchable websites, the interest categories, or combinations thereof.

12. The system of claim 1, wherein the client software apparatus comprises computer instructions for identifying at least one interest category based on a user selected website currently being viewed by a user, and for simultaneously changing the interest category of the user to an alternative interest category that corresponds to the user selected website.

13. The system of claim 1, wherein the client software apparatus comprises computer instructions for identifying an interest category based on letters typed by a user.

14. The system of claim 1, wherein the client software apparatus comprises computer instructions for identifying an interest category based on keywords entered by the user.

* * * * *